C. W. CARTER.
MACHINE FOR SEPARATING WILD PEAS FROM WHEAT, &c.
APPLICATION FILED APR. 30, 1917.
1,328,819.
Patented Jan. 27, 1920.
2 SHEETS—SHEET 1.
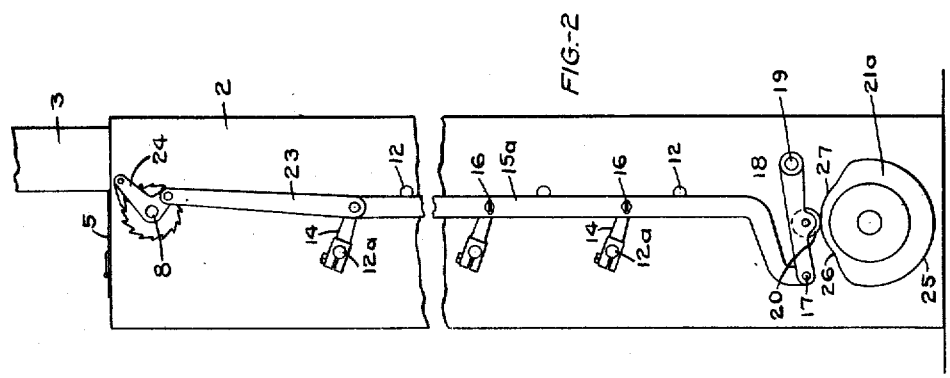
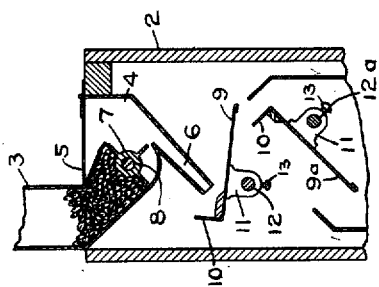
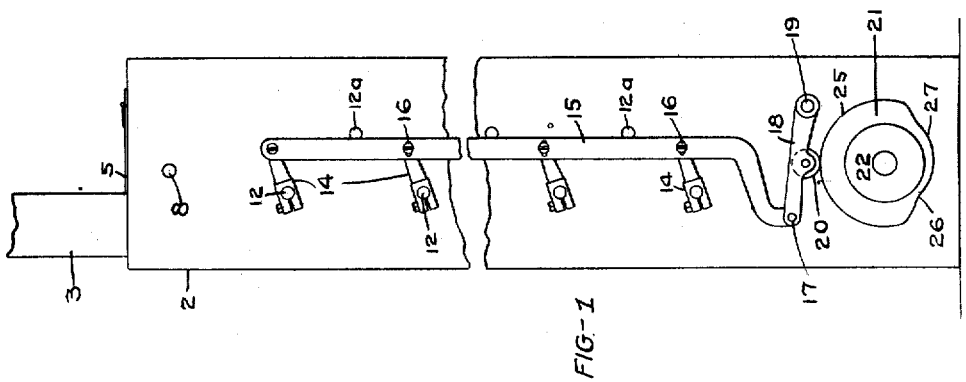
WITNESSES:
B Hall
E. A. Paul
INVENTOR:
CLARENCE W. CARTER:
BY
Paul & Paul
ATTORNEYS.

C. W. CARTER.
MACHINE FOR SEPARATING WILD PEAS FROM WHEAT, &c.
APPLICATION FILED APR. 30, 1917.

1,328,819.
Patented Jan. 27, 1920.
2 SHEETS—SHEET 2.

WITNESSES:
B. Hall
E. A. Paul

INVENTOR:
CLARENCE W CARTER
BY Paul & Paul
ATTORNEYS.

UNITED STATES PATENT OFFICE.

CLARENCE W. CARTER, OF MINNEAPOLIS, MINNESOTA.

MACHINE FOR SEPARATING WILD PEAS FROM WHEAT, &c.

1,328,819.

Specification of Letters Patent.     Patented Jan. 27, 1920.

Application filed April 30, 1917. Serial No. 165,427.

*To all whom it may concern:*

Be it known that I, CLARENCE W. CARTER, a citizen of the United States, resident of Minneapolis, county of Hennepin, State of Minnesota, have invented certain new and useful Improvements in Machines for Separating Wild Peas from Wheat, &c., of which the following is a specification.

In some sections of the country the farmers are troubled to a considerable extent by the growth of wild peas in the wheat, which not only lowers the grade of the wheat, but if the peas are present in a considerable quantity the wheat is rendered unfit for seed, or for grinding purposes.

The object, therefore, of my invention is to provide a machine by means of which practically all the wild pea seeds can be removed from the wheat, advantage being taken of the difference in shape between the peas and the kernels of wheat.

A further object is to provide a machine which will be compact in construction and made up of units in such a way that the machine can be built for any desired capacity by simply multiplying the number of units employed.

A further object of the invention is to provide a machine of comparatively simple construction and one which can be easily operated and cared for.

The invention consists generally in various constructions and combinations, all as hereinafter described and particularly pointed out in the claims.

In the accompanying drawings forming part of this specification,

Figure 1 is an end elevation of a separating machine embodying my invention,

Fig. 2 is a similar view of the opposite end of the machine,

Figure 4:
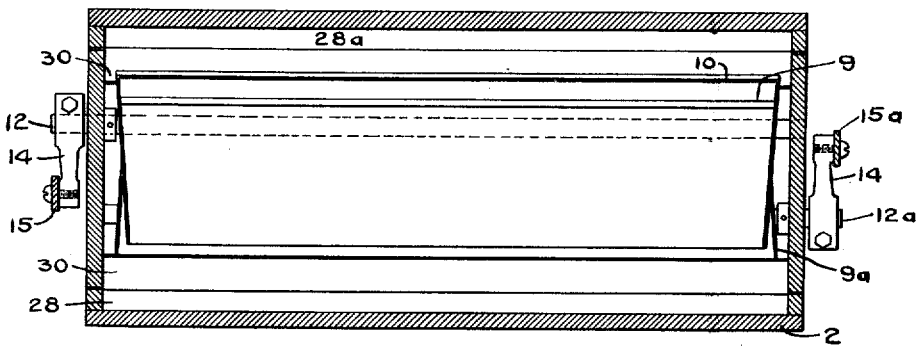

Fig. 3 is a detail sectional view of the upper portion of the machine, showing the preferred manner of feeding the mixture of wheat and peas thereto, Fig. 4 is a horizontal sectional view, showing the arrangement of the separating pans, Figs. 5, 6, 7 and 8 are detail sectional views, showing the manner of delivering the mixture of wheat and peas from one separating pan to another, In the drawing, 2 represents the frame of the machine or unit. There may be any desired number of these units arranged side by side, and of any suitable height to provide as many separating pans as the manufacturer may find necessary or expedient to effect the separation desired.

In the top of the frame I provide a suitable spout 3 in which the mixture of wheat and wild peas is placed. This spout leads to a suitable hopper 4 having a cover 5 to which access may be had to the interior of the hopper whenever desired. A feed spout 6 leads from the hopper and through which the mixture of wheat and peas is discharged by gravity. In the mouth of the hopper I prefer to provide a feed roll 7 mounted on a shaft 8, which has bearings in the end wall of the casing. This feed roll has pockets formed therein and it is mounted for intermediate movement as by a ratchet feed to be hereinafter described. The effect of this movement is to collect a quantity of the wheat and wild peas in a pocket, and then as the feed roll is revolved the contents of the pocket will be discharged into the hopper for delivery of the separating pans beneath.

Figure 5:
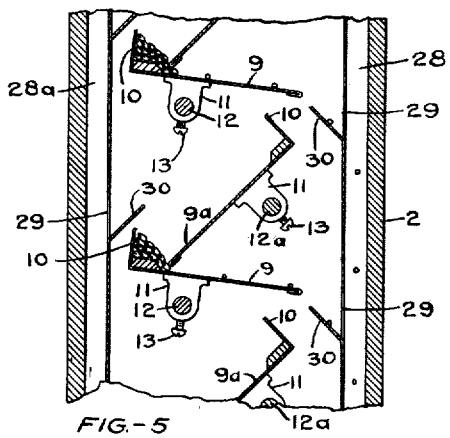

There are two groups of these pans alternately arranged within the casing,—one group I will designate by reference numeral 9 and the other group by the same numeral with the addition of the exponent "a". Each pan is preferably composed of a flat sheet metal plate having an upwardly projecting flange 10 at its rear longitudinal edge, and said pans are provided with depending ears 11 mounted in shafts 12 and 12ª, which are journaled in the end walls of the casing and extend horizontally through the same. The pans are preferably mounted eccentrically on these shafts, that is, the shafts are at one side of the longitudinal center of the pans. There may be any desired number of pans in each group, as experience may determine to be necessary to effect the best possible separation of the peas from the wheel. By means of set-screws 13 mounted in the brackets 11 and engaging the shafts, the pans are supported for rotary adjustment on their shafts to vary their relative position until the desired degree of inclination or movement is obtained. The shafts 12 are provided with crank arms 14 and a connecting bar 15 has a loose connection at 16 with said arms for simultaneous movement thereof. The lower end of said bar is pivotally connected at 17 with an arm 18 that is pivoted at 19 on the machine frame. Intermediate to its pivots the arm 18 has an anti-friction roller 20 in the path of a cam 21 that is revolved by suitable means, as a pulley 22 belted to a suitable source of power (not shown). The other shafts 12ᵃ have similar crank arms thereon provided with a connecting bar 15ᵃ that is operated by a cam 21ᵃ that is oppositely mounted from the cam 21. The bar 15ᵃ preferably has a link 23 connecting it with a ratchet feed 24 for the feed roller 7. Each cam has a high part 25 for contact with the roller 20, and from this high part the roller drops into a low part of the cam 26, from which point the surface 27 rises until it merges again into the high part of the cam. When the anti-friction roller is traveling on the high part of the cam, the pans will be stationary as, for instance, the group of pans 9. As soon, however, as the low part of the cam is reached the pans will be tilted downwardly. The position of these pans will be readily understood from an examination of the figures. Cams are shown in Figs. 1 and 2 in their initial position, and during the time the anti-friction roller is moving on the high part of the cam 21, the pans 9 will be stationary, the upper pan having received a feed of wheat and peas from the hopper and the peas rolling down over the inclined surface of the pan, as indicated in Fig. 5.

Figure 6:
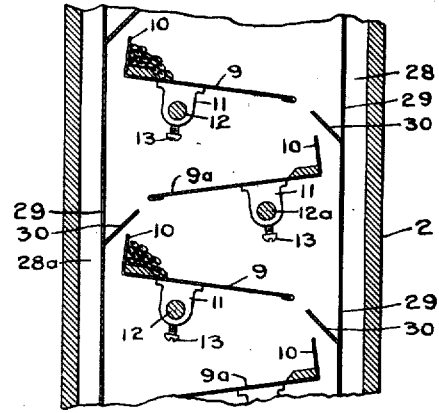
Figure 7:
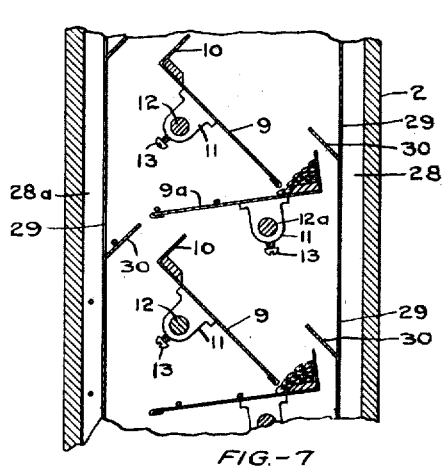
Figure 8:
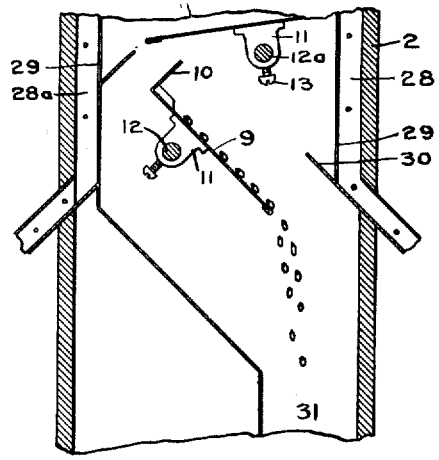

During this period of separation in the upper pan, the cam 21ᵃ will be lifting the pans 9ᵃ until they reach a point for receiving the feed from the pans above. This position is indicated in Fig. 6, the pans 9 being ready to tilt and discharge the feed upon the pans 9ᵃ adjusted to receive it beneath. This alternating action of the pans is due, of course, to the arrangement of the cams, my purpose being to drop each pan quickly as the anti-friction rollers run off from the high part of the cams so that the wheat will surely be dislodged from each pan and delivered to the next one, and upon the delivery I am relying upon the shape of the peas to cause them to roll and bound down over the inclined surfaces of the pans and be discharged at the lower edges thereof.

To receive the peas separately in this manner I prefer to provide vertical spouts 28 and 28ᵃ in opposite sides of the frame, and in the interior walls of said spouts I provide openings 29 formed by pressing lips or flanges 30 out of the wall of the spout and inwardly toward the tilting pans. There will be narrow gaps or openings between these lips and the edges of the pans sufficient to provide clearance for the free oscillation of the pans, but the peas rolling on the pans will bound over these gaps and striking the lips be directed into the spouts and from these discharged out of the machine.

I prefer to form the pans, as shown in Fig. 4, with slight flaring end flanges and reversely arranged so that the narrowest point in the flare of one pan will be adjacent and above the point of greatest flare of the pan beneath, thereby insuring the delivery of all the seed from one pan to another. The capacity of the machine may be increased by adding units, and there may be as many separations effected in each unit as is found necessary to remove the desired percentage of peas from the wheat.

From the lower part of the series the now cleaned wheat is discharged into a suitable spout 31 in the bottom of the machine.

The essential feature of this machine is the arrangement of the pans upon different levels for delivery of the mixture from one to the other and the separation of the peas from the wheat immediately following such delivery and before a pan is tilted to discharge the wheat upon the pan next beneath. I may accomplish this separation by the arrangement of the pans, as shown in the the drawings, which is desirable from a standpoint of economy of space, but the pans may be positioned one above the other in inclined rows and one or more groups, if preferred, without being in staggered relation. In fact, my invention contemplates any suitable arrangement of the pans which will permit the delivery of the mixed wheat and wild peas from one pan to another and separation between the time of delivery of the wheat and peas to a pan and the discharge of the wheat from that pan.

In various ways the details of construction herein shown and described may be modified and still be within the scope of my invention.

I claim as my invention:

1. A machine of the class described comprising a series of separating pans arranged upon different levels, each pan positioned to receive the mixture of grain and wild peas from the pan next above, means for holding each pan stationary for a predetermined period after receiving the mixture to allow the peas to roll off, and means for tilting each pan to discharge the mixture from one pan to the pan next beneath.

2. A machine for separating wild peas from grain comprising a series of pans arranged upon different levels, each pan receiving the material to be separated from the pan next above, said pans being inclined to cause the wild peas to roll therefrom while the grain kernels remain on the pan, means for quickly dropping each pan and holding it stationary for an interval to allow the peas to roll off, and means for tilting the pans intermittently to deliver the grain from the pan above to the pan beneath.

3. A machine for separating wild peas from wheat, comprising a plurality of tilting pans arranged in groups, those of one group alternating in position with those of the other group and tilting in the opposite direction, mechanism for tilting the pans to discharge the material in batches from one pan to the next and for holding said pans stationary for an interval intermediate to the tilting movement to allow the wild peas to roll off.

4. A machine for separating wild peas from wheat, comprising a series of pans arranged in independent groups, the pans of one group being mounted to receive the mixture of wheat and peas from the pans of the other group, the peas rolling down the surfaces of the pans for discharge therefrom while the wheat remains on the pans temporarily, and means for simultaneously tilting the pans of a group alternately with respect to the pans of the other group.

5. A machine for separating wild peas from wheat, comprising a series of tilting members mounted for simultaneous movement, a second series of tilting members arranged adjacent to said first named series and alternating therewith and also mounted for simultaneous movement, means for alternately raising the said members to an inclined receiving and temporary stationary position to allow the peas to roll off by gravity and then tilting to an inclined wheat dumping position to deliver the mixture from the members of one group to those of the other group.

6. A machine for separating wild peas from wheat, comprising groups of separating pans, the pans of one group alternating in position with those of the other group and in staggered relation, the end walls of said pans being flared from one longitudinal edge to the other and the shorter edge of one pan overhanging the longer edge of the adjacent pan, means for tilting the pans and holding them stationary at a predetermined point in their movement.

7. A machine for separating wild peas from wheat, comprising a casing, groups of separating pans mounted therein, the pans of one group alternating in position with those of the other group and in staggered relation thereto, means for tilting said groups of pans alternately, one group being raised from their receiving position preliminary to the tilting of the other group to their dumping position, pea receiving spouts provided in said casing and means adjacent the discharge edges of said pans for directing the peas, rolling by gravity thereto into said spouts.

8. A machine of the class described comprising a frame, a series of separating pans mounted therein upon different levels, a series of cams, mechanism actuated by said cams for tilting said pans, said cams being formed to allow said pans to remain stationary at a predetermined point in their travel and allow said pans to drop abruptly at another point in their movement, whereby the mixture of wheat and peas will be so delivered from one pan to another that the peas upon striking a pan will begin to roll thereon, for the purpose specified.

9. A machine of the class described comprising a frame, a series of shafts mounted in staggered relation therein, one above the other, a series of separating pans mounted on said shafts, an operating shaft and cams secured thereon, said shafts being divided into groups and mechanisms operated respectively by said cams for rocking said groups of shafts and pans, one cam being mounted in opposing relation to the other cam to hold one group of pans stationary while the other group is being tilted, the wild peas being separated from the wheat by rolling off said pans during the stationary periods thereof.

10. The combination, with a frame, of a series of tilting pans mounted therein and means for delivering a mixture of wheat and wild peas thereto, a cam and mechanism actuated thereby for tilting said pans, said pans being held stationary while said mechanism is riding on the high part of said cam and being abruptly tilted when said mechanism passes off the high part of said cam, the material on said pan being delivered in batches by said abrupt tilting and the peas rolling off said pans and being thereby separated from the wheat during the stationary period of said pans.

11. A machine of the class described comprising a frame, a series of separating pans mounted therein upon different levels, mechanism for tilting said pans, said mechanism being constructed to allow said pans to remain stationary at a predetermined point in their travel and dropping them abruptly at another point in their movement, whereby the mixture of grain and peas will be so delivered from one pan to another that the peas upon striking a pan will begin to roll thereon.

In witness whereof, I have hereunto set my hand this 24th day of April, 1917.

CLARENCE W. CARTER.